(12) United States Patent
Mauricio et al.

(10) Patent No.: US 11,428,503 B1
(45) Date of Patent: Aug. 30, 2022

(54) DIGITAL AIMING SYSTEM FOR WEAPON

(71) Applicant: Trijicon, Inc., Wixom, MI (US)

(72) Inventors: Jeremiah Mauricio, Tecumseh, MI (US); Andrew Boss, Brighton, MI (US)

(73) Assignee: Trijicon, Inc., Wixom, MI (US)

( * ) Notice: Subject to any disclaimer, the term of this patent is extended or adjusted under 35 U.S.C. 154(b) by 0 days.

(21) Appl. No.: 17/220,996

(22) Filed: Apr. 2, 2021

(51) Int. Cl.
*F41G 1/38* (2006.01)
*G02B 7/09* (2021.01)
*G02B 23/16* (2006.01)

(52) U.S. Cl.
CPC .................. *F41G 1/38* (2013.01); *G02B 7/09* (2013.01); *G02B 23/16* (2013.01)

(58) Field of Classification Search
CPC .............. F41G 1/38; G02B 7/09; G02B 23/16
See application file for complete search history.

(56) References Cited

U.S. PATENT DOCUMENTS

| | | | |
|---|---|---|---|
| 4,531,052 A | 7/1985 | Moore | |
| 5,171,933 A | 12/1992 | Eldering | |
| 5,276,554 A * | 1/1994 | Nassivera | F41G 1/38 359/826 |
| 5,528,847 A * | 6/1996 | Fisher | G02B 23/14 42/122 |
| 5,930,934 A * | 8/1999 | Fisher | F41G 1/38 42/122 |
| 7,170,692 B2 * | 1/2007 | Toguchi | G02B 7/102 359/698 |
| 7,624,528 B1 | 12/2009 | Bell et al. | |
| 7,905,046 B2 | 3/2011 | Smith, III | |
| 9,062,961 B2 | 6/2015 | Chen et al. | |
| 9,310,165 B2 | 4/2016 | Bell et al. | |
| 9,323,061 B2 | 4/2016 | Edwards et al. | |
| 9,383,166 B2 | 7/2016 | Jahromi | |
| 9,389,425 B2 | 7/2016 | Edwards et al. | |
| 9,494,787 B1 | 11/2016 | Bagwell | |
| 2003/0082502 A1 * | 5/2003 | Stender | F41J 5/10 434/23 |
| 2005/0271373 A1 * | 12/2005 | Tomita | H04N 5/232123 348/E5.045 |
| 2009/0091634 A1 * | 4/2009 | Kennedy | G02B 23/12 250/214 AG |
| 2010/0060982 A1 * | 3/2010 | Thomas | G02B 7/10 359/422 |
| 2015/0130950 A1 | 5/2015 | Bacarella et al. | |
| 2016/0061566 A1 * | 3/2016 | Chen | F41G 1/38 359/421 |
| 2018/0100721 A1 * | 4/2018 | Lee | F41G 3/165 |
| 2019/0014243 A1 * | 1/2019 | Malone | G02B 27/023 |
| 2020/0284551 A1 * | 9/2020 | Brown | G02B 1/00 |
| 2021/0033817 A1 * | 2/2021 | Masuki | G03B 11/043 |
| 2021/0318513 A1 * | 10/2021 | Cai | G01D 5/16 |

\* cited by examiner

*Primary Examiner* — Joshua E Freeman
(74) *Attorney, Agent, or Firm* — Harness, Dickey & Pierce, P.L.C.

(57) ABSTRACT

An optic for a firearm includes a housing, an optics train, an adjustment ring, and a detector. The optics train is disposed within the housing and along a longitudinal axis of the housing. The adjustment ring is supported by the housing and configured to adjust a magnification of the optics train. The detector is engaged with the adjustment ring and configured to convert rotation of the adjustment ring into a digital magnification.

12 Claims, 12 Drawing Sheets

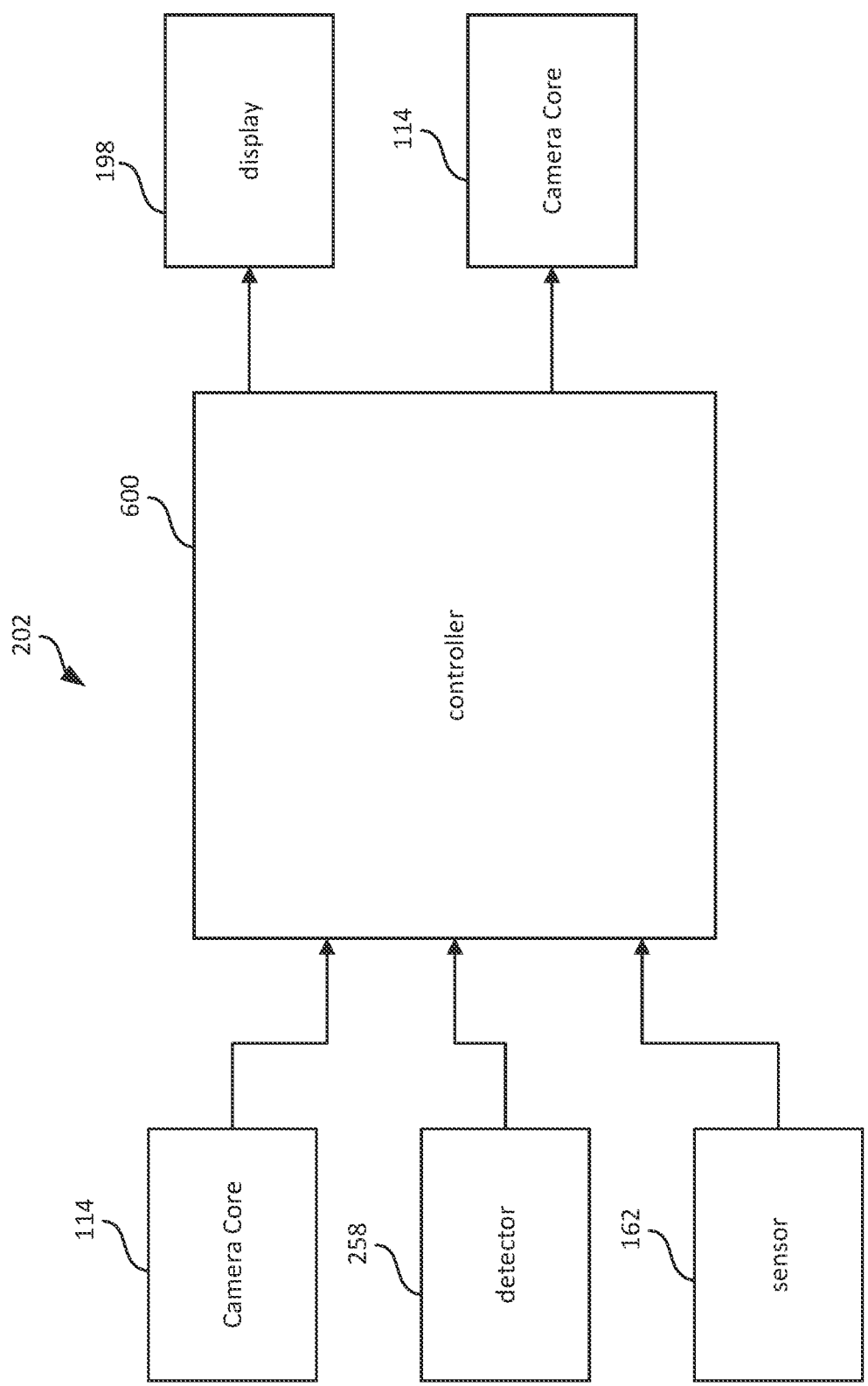

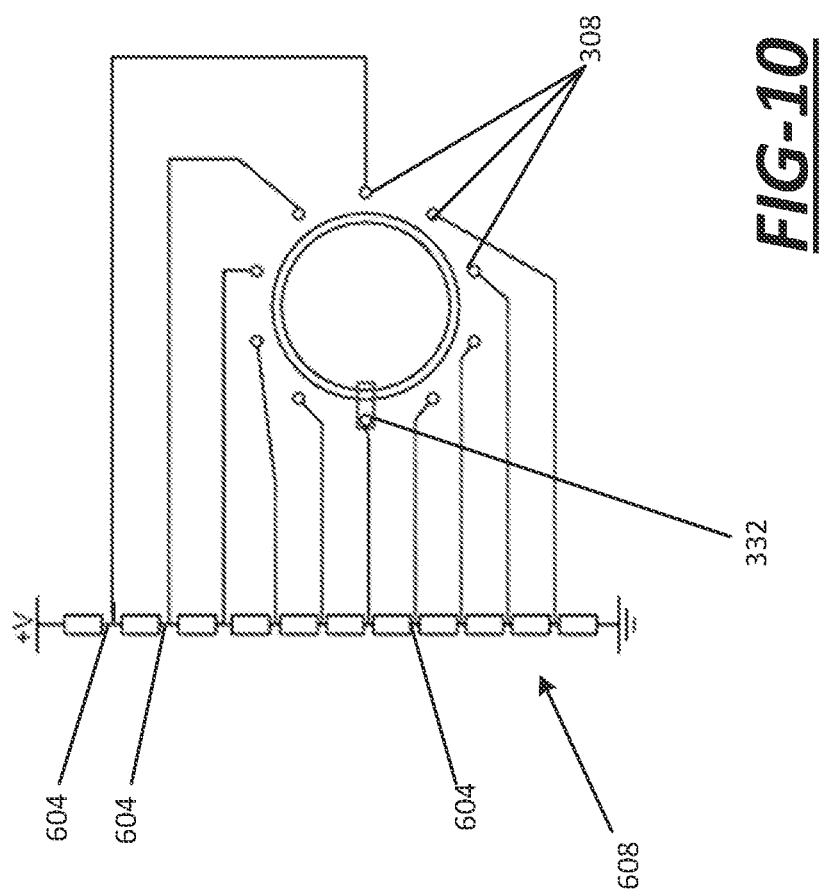

DIGITAL AIMING SYSTEM FOR WEAPON

FIELD

The present disclosure relates to digital optics for weapons, and more specifically, to digital optics having a digital zoom feature.

BACKGROUND

This section provides background information related to the present disclosure which is not necessarily prior art.

Optics for firearms often include the ability to change the magnification of the optic, also known as a zoom function. The zoom function is achieved in one of two ways: mechanical zoom and digital zoom. Mechanical zoom involves adjustment of an objective lens by moving the objective lens within the housing of the optic. Often a ring is rotated by a user to manually move the objective lens within the housing.

Digital zoom is generally much more complex than mechanical zoom. Digital zoom optics include complex buttons and menus for setting the zoom feature. A user will provide an input for a zoom setting using the buttons and menus. The optic will then manipulate or adjust the lenses according to the input from the user.

SUMMARY

This section provides a general summary of the disclosure, and is not a comprehensive disclosure of its full scope or all of its features.

An example optic for a firearm according to the present disclosure includes a housing, an optics train, an adjustment ring, and a detector. The optics train is disposed within the housing and along a longitudinal axis of the housing. The adjustment ring is supported by the housing and configured to adjust a magnification of the optics train. The detector is engaged with the adjustment ring and configured to convert rotation of the adjustment ring into a digital magnification.

The detector of the example optic may include a resistor board and a detector board. The detector board may have fingers that engage with the resistor board.

For example, the detector board may be fixed for rotation with the adjustment ring and the resistor board may be fixed to the housing.

For example, the fingers may engage with petals on the resistor board.

The detector of the example optic may include a sensor board and a magnet board.

For example, the magnet board may include a plurality of magnets.

For example, the magnets may be embedded within the magnet board.

For example, the magnets may be printed on the magnet board.

For example, the sensor board may include a magnetic field sensor that senses a magnetic field of the plurality of magnets.

For example, the magnet board may be fixed for rotation with the adjustment ring, and the sensor board may be fixed to the housing.

An example method for controlling an optic for a firearm according to the present disclosure includes detecting, by a detector, rotation of an adjustment ring; converting, by the detector, the rotation of the adjustment ring to a digital signal; correlating, by a controller, the digital signal to a magnification; and adjusting, by the controller, a magnification of the optic.

The detecting rotation of the adjustment ring may include detecting a resistance change between fingers on a detector board and a resistor board. The detector board may be configured to rotate with rotation of the adjustment ring.

The detecting rotation of the adjustment ring may include detecting a magnetic field change by a magnetic field sensor of a position of a plurality of magnets on a magnet board. The magnet board may be configured to rotate with rotation of the adjustment ring.

For example, the plurality of magnets may be embedded in the magnet board.

For example, the plurality of magnets may be printed on the magnet board.

An example control system for an optic for a firearm according to the present disclosure includes a detector and a controller. The detector is configured to detect rotation of an adjustment ring and to convert the rotation of the adjustment ring to a digital signal. The controller is configured to correlate the digital signal to a magnification and to adjust a magnification of the optic.

The detector of the example control system may be configured to detect a resistance change between fingers on a detector board and a resistor board. The detector board may be configured to rotate with rotation of the adjustment ring.

The detector of the example control system may be configured to detect a magnetic field change by a magnetic field sensor of a position of a plurality of magnets on a magnet board. The magnet board may be configured to rotate with rotation of the adjustment ring.

For example, the plurality of magnets may be embedded in the magnet board.

For example, the plurality of magnets may be printed on the magnet board.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a schematic of an aiming system of the optic in FIG. 1.

FIG. 10 is an electrical schematic for an example detector of the optic in FIG. 1.

Corresponding reference numerals indicate corresponding parts throughout the several views of the drawings.

DETAILED DESCRIPTION

Figure 1:
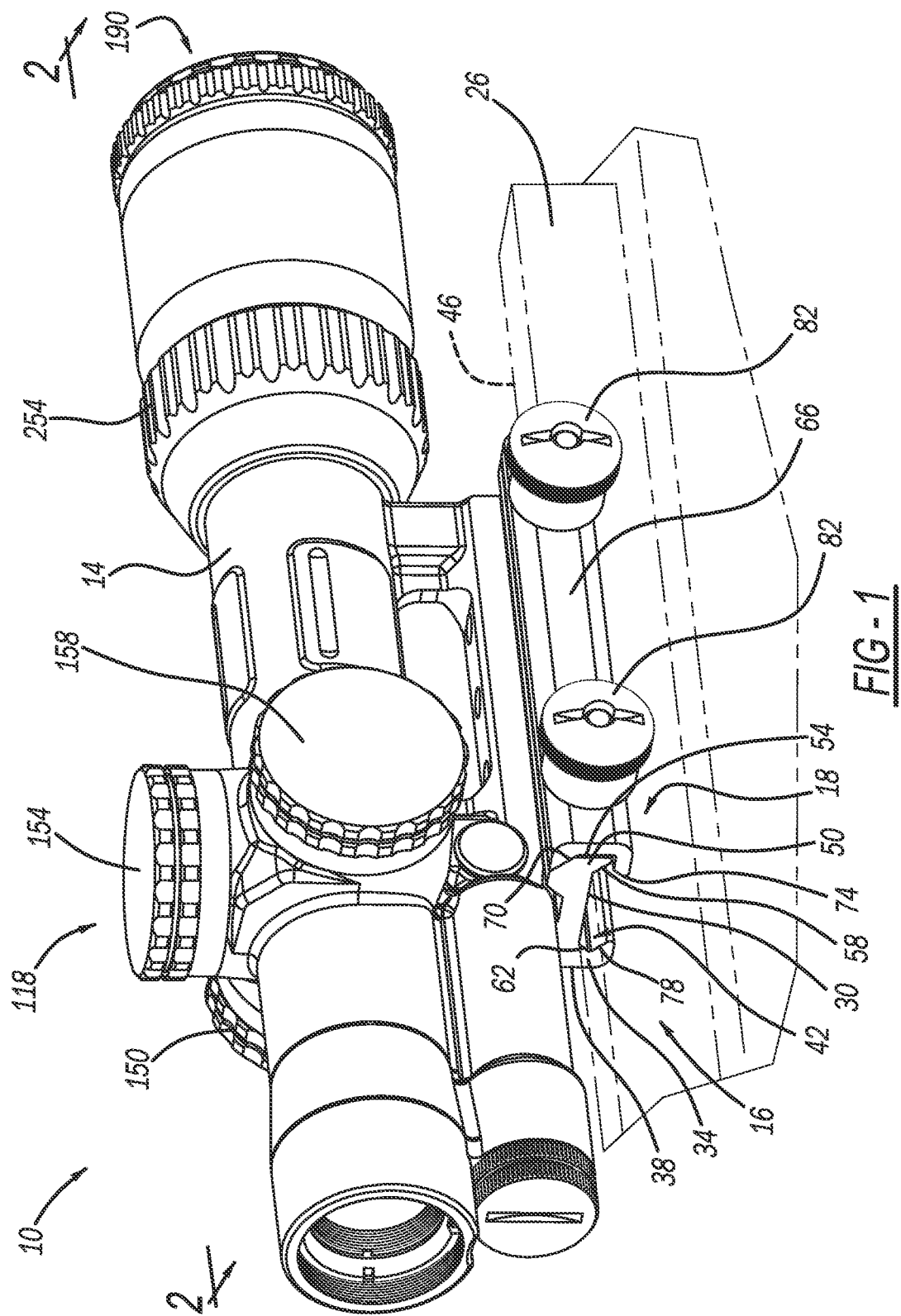
FIG. 1 is a perspective view of a digital aiming system, or digital optic, according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Generally optics for weapons may adjust magnification (i.e., a zoom function) in one of two ways: mechanical zoom and digital zoom. Mechanical zoom adjusts an objective lens by moving the objective lens within the housing of the optic. Often a ring is rotated by a user to manually move the objective lens within the housing.

Digital zoom is generally much more complex than mechanical zoom. Digital zoom optics include complex buttons and menus operated by a user to provide an input for a zoom setting on the optic. The optic then manipulates or adjusts the magnification according to the input from the user.

Each of the mechanical zoom and digital zoom options has its own challenges. For example, the mechanical zoom requires the housing to be large enough to adjust an objective lens longitudinally within the housing. Thus, optics having the mechanical zoom feature tend to be larger, heavier optics that are more complex in parts. The optic is further limited to the magnification range that it is built to achieve.

For example, the digital zoom requires complexity in function. A user must navigate menus and use buttons as inputs. This can be challenging in a number of circumstances (for example, circumstances necessitating quick focus and fire, etc.) and in inclement weather (cold, rain, etc.). Additionally, many optics having digital zoom have an increased expense and a complex processing system.

The present disclosure describes a digital zoom for an optic that decreases complexity and weight over the traditional zoom types, allows for ease-of-use, and variability of parts. Instead of requiring complex menus and buttons, the optic of the present disclosure adjusts by manipulating or turning a ring, similar to a mechanical-type zoom. However, instead of requiring the housing space as with a mechanical zoom optic, the optic of the present disclosure adjusts the magnification digitally, requiring a much smaller housing space and allowing for a much smaller overall package. Thus, the optic of the present disclosure provides decreased complexity and weight.

Additionally, the optic of the present disclosure provides the ability for interchangeable parts. For example, front halves and back halves may be mixed and matched to create optics with new features. The front half of the optic may include the objective assembly, sensors, and the camera. The back half may include the eyepiece, the display, the processor, and the support electronics for the digital system. For example, the separation between the front half and the back half is may be some layer in the electronics between the sensor in the front half and the display in the back half.

Figure 2:
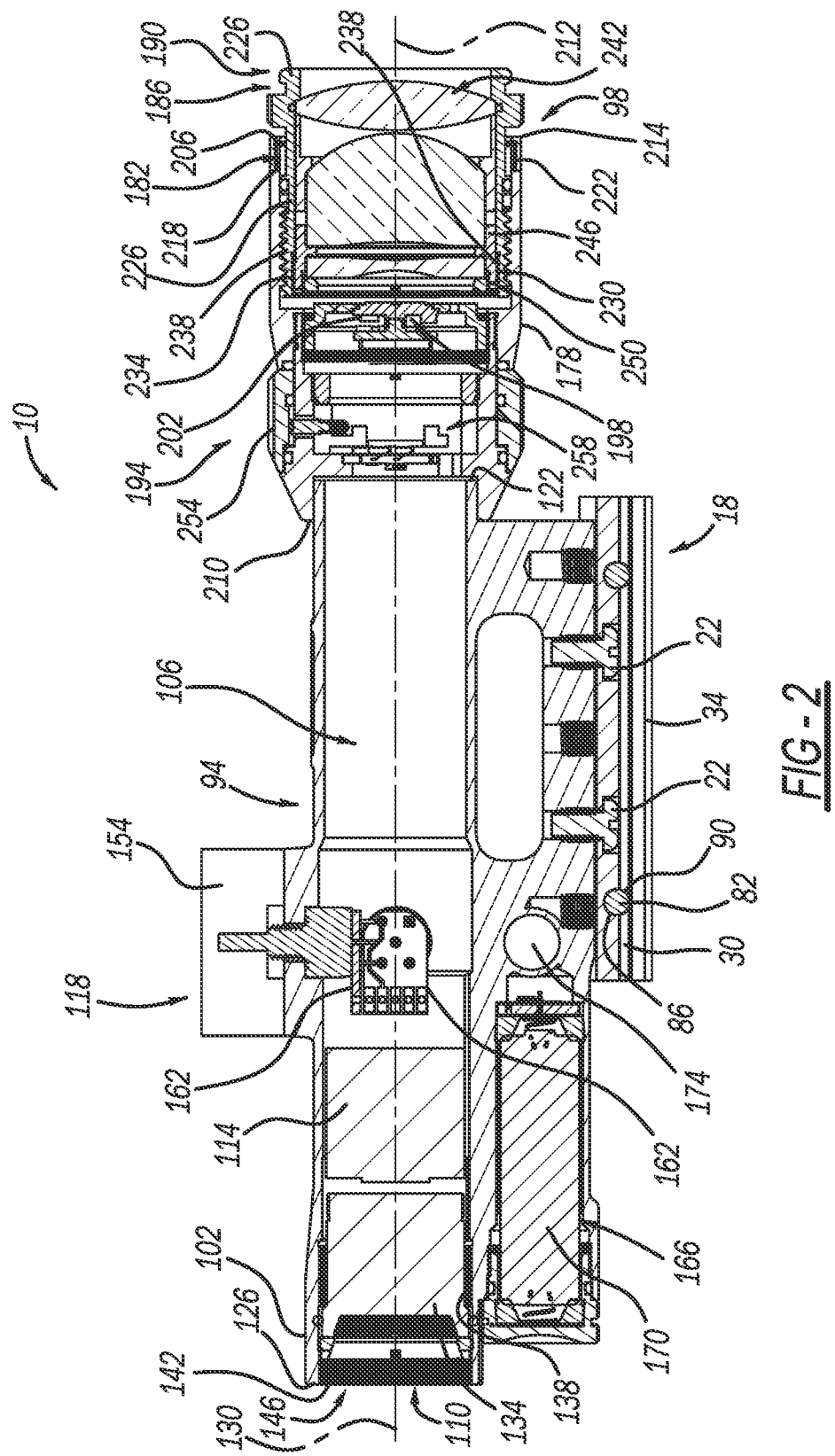
FIG. 2 is a cross-sectional view of the optic in FIG. 1.

Now referring to FIGS. 1 and 2, a digital aiming system, or digital optic, 10 according to the present disclosure is illustrated. The digital aiming system 10 may include a housing 14 and a mount 18 for attaching or fixing the housing 14 on a weapon 16. The mount 18 may be integrally formed with the housing 14. Alternatively the mount 18 may be attached to the housing 14 by one or more fasteners 22, such as screws (FIG. 2), or the like. The mount 18 may be configured to attach the housing 14 to a rail 26 of a firearm 16. Alternatively, the mount 18 may be configured to attach the housing 14 to any other weapon or mounting system 16.

For example, the mount 18 may include a first, or bottom, surface 30 for engaging the mount 18 with the firearm 16. The mount 18 may contact a slide, a top surface, or a rail 26 of the firearm 16. The first surface 30 may include a first projection 34 extending from one longitudinal side 38 of the first surface 30 for securing the mount 18 to the firearm 16. The first projection 34 may include a channel 42 extending along its length. The channel 42 may be "V"-shaped, "U"-shaped, squared, etc. for receiving a first side 46 of the rail 26. A second projection 50 may extend from an opposing longitudinal side 54 of the first surface 30. The second projection 50 may have a sloped inner wall 58 that is sloped similar to (but mirrored to) a top half 62 of the channel 42 in the first projection 34. A clamp 66 may align on an outer surface 70 of the second projection 50 and include a sloped inner wall 74 that extends below and aligns with the sloped inner wall 58 of the second projection 50. The sloped inner wall 74 of the clamp 66 may be sloped similar to (but mirrored to) a bottom half 78 of the channel 42 in the first projection 34. The first projection 34, second projection 50, and clamp 66 may cooperate to clamp or secure the mount 18 on the firearm 16. For example, one or more fasteners 82 may extend through apertures 86 in the first surface 30, the second projection 50 (aperture not shown), and the clamp 66 (aperture not shown), and be threaded into apertures 90 in the first projection 34 to clamp and secure the mount 18 onto the firearm 16. Therefore, the fasteners 82 prevent the mount 18 from moving relative to the firearm 16.

The housing 14 may support a front half 94 and a back half 98. The front half 94 and back half 98 may be assembled together permanently by adhesive, welding, or other bonding. Alternatively, the front half 94 and the back half 98 may be removably fixed together by threaded engagement, snap-fit engagement, or other fastening.

Referring to FIG. 2, the front half 94 of the housing 14 may include a front housing 102 defining a major interior space 106 and supporting an objective lens assembly 110, a camera core 114, and an adjustment system 118. The front housing 102 may be a generally tubular or cylindrically shaped housing and may include a first end 122 and a second end 126 disposed opposite the first end 122. A longitudinal axis 130 may extend between the first end 122 and the second end 126. The first end 122 of the front housing 102 may engage the back half 98 of the housing 14. The second end 126 of the front housing 102 may be a "free end" of the front housing 102 and may be aligned with an object to be viewed through the digital aiming system 10.

While the front housing 102 is illustrated and described as including the objective lens assembly 110, the camera core 114, and the adjustment system 118, it is understood that the front housing 102 may only include the objective lens assembly 110 and the camera core 114, and the adjustment system 118 may be included with the back half 98 of the housing 14.

The objective lens assembly 110 may be disposed proximate to the second end 126 of the front housing 102 and may include a series of objective lenses 134. The objective lenses 134 may be retained and supported within the front housing 102 via at least one retention collar 138. In one configuration, the retention collar(s) 138 threadably engages internal threads 142 within an opening 146 in the second end 126 of the front housing 102 to position and retain the objective lenses 134 at a desired location along the longitudinal axis 130 of the front housing 102.

For example, the objective lens assembly 110 may include a convex-plano doublet lens having a substantially doublet-convex lens and a substantially concave-convex lens secured together by a suitable adhesive and a convex-plano singlet lens. The lenses 134 may be secured within the second end 126 of the front housing 102 via a threaded retainer ring (such as retention collar 138) and/or adhesive to position and attach the lenses 134 relative to the front housing 102.

The camera core 114 may be positioned adjacent the objective lens assembly 110. The camera core 114 may capture digital video images of a target scene that are processed and provided to the user. The target scene may be a scene captured through the opening 146 in the second end 126 of the front housing 102. The images may be continuously captured by the camera core 114 and streamed to the user through a display (described below).

For example, light from the target scene may enter the opening 146 in the second end 126 of the front housing 102 of the digital aiming system 10 and may be captured by the camera core 114. The images may then be processed and/or provided to a display of the digital aiming system 10, as described herein. For example, the images may be zoomed images of the target scene provided by optical zoom and/or digital zoom features of the camera core 114 and/or the processing system.

The camera core 114 may be one of various types of cameras. The camera core may include a camera sensor, or may be a camera sensor, that detects various wavelengths of light. For example, camera core 114 may capture images of visible light, infrared spectrum wavelengths, thermal spectrum wavelengths, hyperspectral wavelengths, and/or another type of camera as may be appropriate in applications. Thus, high resolution digital images, infrared images, thermal images, and/or other types of images of any desired spectra may be captured.

The adjustment system 118 may be configured to position a portion of the image relative to the housing 14 to properly align a reticle pattern (not shown) relative to the firearm. The adjustment system 118 may include a windage adjustment turret 150, an elevation adjustment turret 154, a brightness adjustment turret 158, or any other type of adjustment turret or adjustment knob, for example, contrast, magnification adjustment, etc. The windage adjustment turret 150, the elevation adjustment turret 154, and the brightness adjustment turret 158 collectively adjust an alignment of the reticle pattern.

Rotation of the windage adjustment turret 150 may move the alignment of the reticle pattern horizontally. For example, rotation of the windage adjustment turret 150 may be detected by a sensor 162 positioned adjacent the adjustment system 118 in the front housing 102. The sensor 162 may communicate with a processor, described below, to move the horizontal position of the reticle pattern.

For example, the sensor 162 may be a single-pole, multi-throw switch, an inductive sensor, a Hall Effect sensor, or any other type of rotary sensor or other sensor that detects rotation and position of a turret. In a single-pole, multi-throw switch, a rod connected to the turret and rotating with the turret includes a contact that makes an electrical connection with terminals on a printed circuit board as the rod rotates. The terminals on the printed circuit board are connected to circuit nodes on a voltage divider. An electrical connection between the contact and the terminals complete a circuit, providing an output from the sensor 162.

In an inductive sensor, coils are printed on a printed circuit board of the sensor 162. A transmitter coil generates an alternating current (AC) magnetic field that couples to a pair of receiver coils that are arranged to be 90° out of phase electrically. A conductive target is affixed to a rod that is connected to the turret and rotates with the turret. The transmitter coil is excited and feedback from the receiver coils is output from the sensor 162 to determine position information of the turret.

In a Hall Effect sensor, magnetic flux changes are detected when the turret is rotated. The turret includes a rod connected to the turret and rotating with the turret. The rod includes outward-facing gear teeth that interface with a small gear having a magnet at a center thereof. The magnet is magnetized such that the poles are normal to the cylinder axis. As the turret is rotated, the intermeshed gear teeth cause the magnet to rotate. As the magnet rotates, a magnetic sensor detects a change in pole position. The position of the magnet is digitized and output from the sensor 162 for interpretation.

Rotation of the elevation adjustment turret 154 may move the alignment of the reticle pattern vertically. For example, rotation of the elevation adjustment turret 154 may be detected by the sensor 162, or alternatively, a secondary sensor 162, positioned adjacent the adjustment system 118 in the front housing 102. The sensor 162, or alternative secondary sensor 162, may communicate with the processor, described below, to move the vertical position of the reticle pattern.

Rotation of the brightness adjustment turret 158 may increase or decrease a light intensity of the reticle or change a color of the reticle. For example, rotation of the brightness adjustment turret 158 may be detected by the sensor 162, or alternatively a secondary, or tertiary, sensor 162, positioned adjacent the adjustment system 118 in the front housing 102. The sensor 162, or alternative secondary sensor or tertiary sensor 162, may communicate with the processor, described below, to brighten the reticle, dim the reticle, or change a color of the reticle displayed to the user.

The front housing 102 may also define a secondary interior space 166 housing a power source 170. The power source 170 may be a power storage unit, for example, a battery. The power source 170 may supply power to the camera core 114 and/or other features of the digital aiming system 10.

A Next Unit of Computing (NUC) 174 may be positioned adjacent the power source 170 and aligned with the adjustment system 118. The NUC 174 may receive power from the power source 170 and may be in communication with the camera core 114, as described below.

The back half 98 of the housing 14 may include a back housing 178 defining an interior space 182 and housing an ocular assembly 186 supported by an eyepiece 190, a zoom assembly 194, a display 198, and a processor 202. It is understood that while the back housing 178 is illustrated and described as including the ocular assembly 186, the eyepiece 190, the zoom assembly 194, the display 198, and the processor 202, it is understood that the back housing 178 may additionally include the adjustment system 118 or the back housing 178 may only include the eyepiece 190 and the ocular assembly 186 and the zoom assembly 194, the display 198, and the processor 202 may be included in the front half 94.

The back housing 178 may be a generally tubular or cylindrically shaped housing and may include a first end 206 and a second end 210 disposed opposite the first end 206. A longitudinal axis 212 may extend between the first end 206 and the second end 210 and may align with longitudinal axis 130 of the front housing 102.

The second end 210 of the back housing 178 may be engaged with the first end 122 of the front housing 102. For example, the second end 210 of the back housing 178 may be threadably engaged, adhesively fixed, press-fit, or otherwise engaged with the first end 122 of the front housing 102.

The first end 206 of the back housing 178 may engage with the eyepiece 190. For example, the eyepiece 190 is adjustably attached to the back housing 178 at the first end 206 via an attachment collar 214. The first end 206 of the back housing 178 includes a series of threads 218 that cooperate with a first series of threads 222 of the attachment collar 214 to secure the attachment collar 214 to the back housing 178. The eyepiece 190 includes a housing 226 having a series of external threads 230 and a series of internal threads 234. The external threads 230 engage a second series of internal threads 238 of the back housing 178 to attach and permit adjustment of the eyepiece 190 relative to the back housing 178. The attachment collar 214 therefore positions the eyepiece 190 relative to the first end 206 of the back housing 178 and allows the eyepiece 190 to support and position the ocular assembly 186 relative to the back housing 178.

The ocular assembly 186 may include a series of lenses 242. The ocular assembly 186 may be supported by the eyepiece 190 relative to the back housing 178 by one or more retention collars 246. For example, the retention collars 246 threadably engage internal threads 250 to retain and position the lenses 242 of the ocular assembly 186 within the eyepiece 190.

For example, the ocular assembly 186 is disposed generally on an opposite end of the digital aiming system 10 from the objective lens assembly 110 and includes the eyepiece lens, which may be of a bi-convex singlet or substantially doublet-convex type lens, and a doublet ocular lens. Hereinafter, the eyepiece lens will be described as a doublet-convex eyepiece lens. The doublet ocular lens may include a substantially doublet-convex lens and a substantially doublet-concave lens secured together by a suitable adhesive. The doublet-convex eyepiece lens and doublet ocular lens may be held in a desired position relative to the eyepiece 190 via a threaded retainer ring (such as retention collar 246). While threaded retainer ring is disclosed, the doublet-convex eyepiece lens and doublet ocular lens could alternatively and/or additionally be attached to the eyepiece 190 using an adhesive.

The zoom assembly 194 may be supported within the back housing 178 and may be in communication with the processor 202. The zoom assembly 194 may include an adjustment ring 254 and a detector 258. The adjustment ring 254 may be positioned around an external surface of the back housing 178 and be configured to rotate relative to the back housing 178. Rotation of the adjustment ring 254 adjusts magnification of the digital aiming system 10 through communication with the detector 258. For example, rotation of the adjustment ring 254 from left to right may increase the magnification of the display. Alternatively, rotation of the adjustment ring 254 from left to right may decrease the magnification of the display.

The ocular assembly 186, the zoom assembly 194, the camera core 114, the display 198, and the objective assembly 110 may cooperate to form an optics train for the digital aiming system 10. As shown in the figures, the optics train is positioned along the longitudinal axis 130 of the front housing and the longitudinal axis 212 of the back housing. The optics train may cooperate with the housing 14 to provide a magnified image of a target object.

Figure 3:
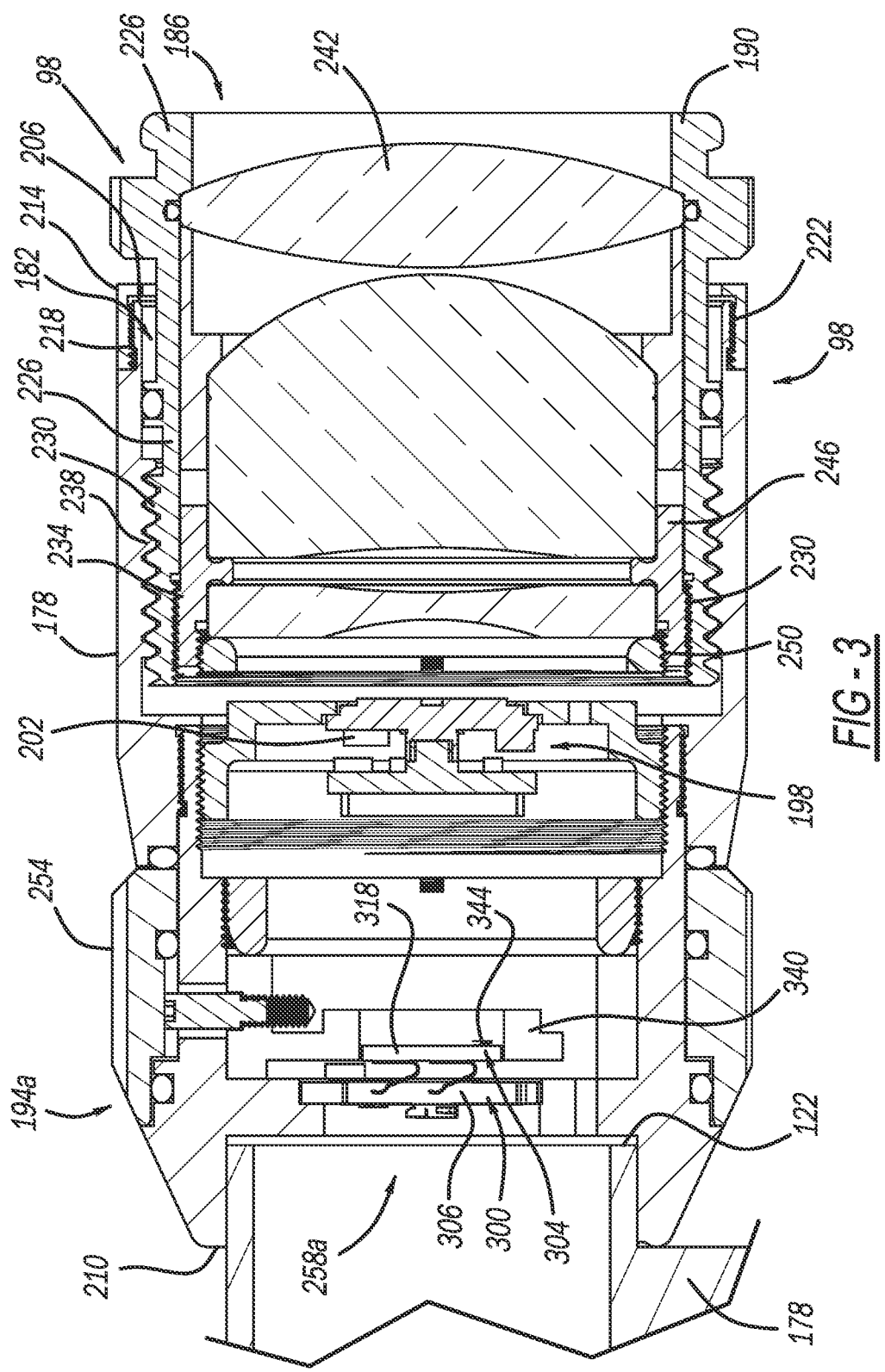
FIG. 3 is a sectional view of one embodiment of the optic in FIG. 2.
Figure 4A:
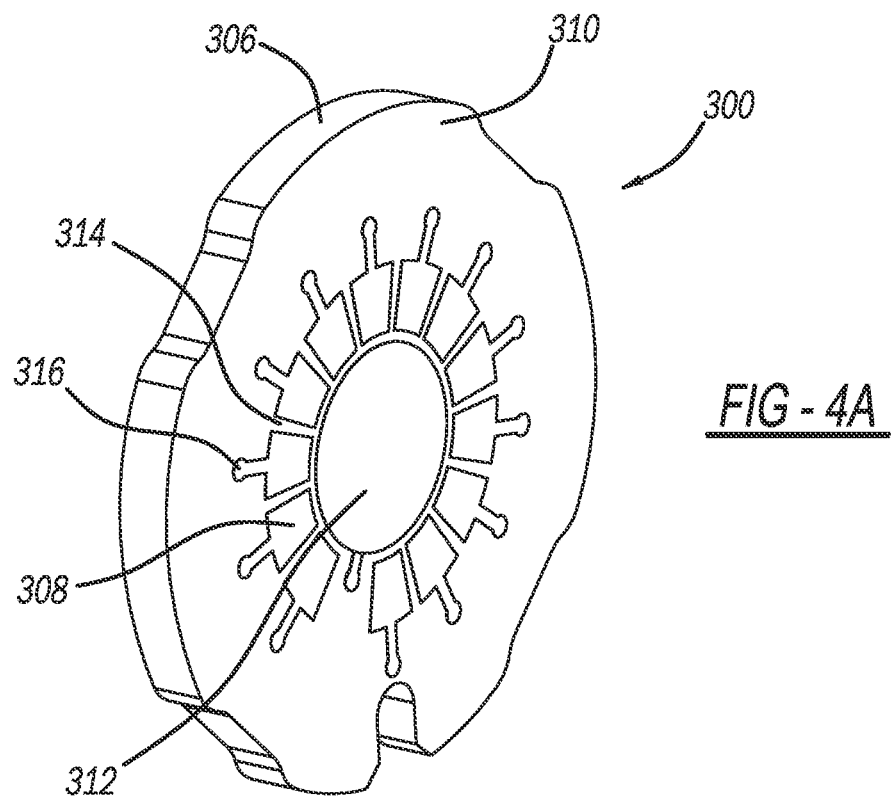
FIG. 4A is a perspective view of a resistor board of the optic in FIG. 3.
Figure 4B:
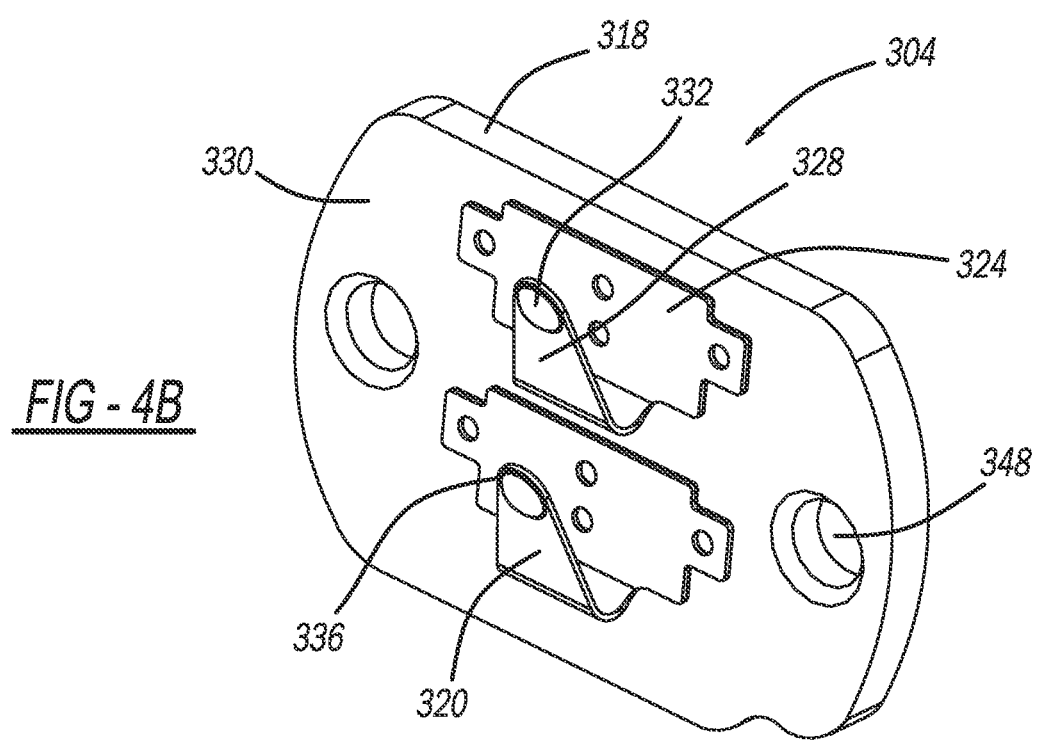
FIG. 4B is a perspective view of a detector board of the optic in FIG. 3.

Referring to FIGS. 3, 4A, and 4B, in one configuration, zoom assembly 194a may include a detector 258a having a resistor board 300 and a detector board 304. Detector 258a may convert rotation of the adjustment ring 254 into a digital signal. As shown in FIG. 4A, the resistor board 300 may include a plate 306 and a plurality of petals 308. The plate 306 may be a panel or thick sheet having opposing planar faces. For example, the plate 306 may be formed of a composite, a ceramic, or other non-conductive material.

Each of the plurality of petals 308 may be an electrical contact on the plate 306. For example, the plurality of petals 308 may be formed in a circular pattern on a face 310 of the plate 306 and may be disposed radially about a center disc 312. Alternatively, the plurality of petals 308 may be formed in any pattern deemed suitable for determining rotation of the detector board 304.

The plurality of petals 308 may have a shape that allows for maximum coverage of the surface area, but leaving gaps 314 between each petal 308 (to identify and separate the petals 308). For example, the petals 308 may have a trapezoidal shape to form a ring with gaps 314 to distinguish between each of the petals 308. Alternatively, the petals 308 may have any shape that suits a particular embodiment. Each of the petals 308 may include a tab or other projection 316 extending radially away from the petal 308. The petals 308, tabs 316, and center disc 312 may be formed of the same or similar material and/or a same or similar surface feature.

The petals 308 (and thus, the tabs 316 and center disc 312) may be formed of a material different from a material of the resistor board 300 such that the petals 308 may be distinguished from the resistor board 300 and detected by the detector 258a. Alternatively, the petals 308 may include a different surface feature, a magnetization, a different color, or any other feature that distinguishes the petals 308 from the resistor board 300. For example, the petals 308 may be formed of a conductive material, such as gold, copper, or another metal.

As illustrated in FIG. 4B, the detector board 304 may include a plate 318 and one or more fingers 320 (for example, two fingers 320) fixed thereon. The plate 318 may be a panel or thick sheet having opposing planar faces. For example, the plate 318 may be formed of a composite, a ceramic, or other non-conductive material.

Each of the finger(s) 320 may include a base 324, an arm 328, and a contact 332. The base 324 may be a generally rectangular (or other-shaped) base and may be fixed to a face 330 of the plate 318 by a fastener (for example, such as screws, adhesive, or any other appropriate fastener). The arm 328 connects the contact 332 with the base 324. For example, the arm 328 may be a V-shaped, or U-shaped arm. Alternatively, the arm 328 may be any shape that fits the particular needs of the embodiment. The contact 332 may be a bulge, a projection, or a bump, at a free end 336 of the arm 328.

The base 324, arm 328, and contact 332 may be a single, monolithically-formed, finger 320. For example the finger 320 may be formed of a conductive material, such as metal (e.g., gold, copper, aluminum, etc.) or any other appropriate conductive material. The arm 328 may be monolithically formed with the base 324 and may be bent during processing to form the V-shape, U-shape, or other shape. The contact 332 may be monolithically formed with the arm 328 and may be stamped during processing to form the bulge or projection.

As assembled (FIG. 3), the plate 318 of the detector board 304 is fixed to a disc 340 which is either integral with or fixed to the adjustment ring 254 and rotating therewith. For example, the plate 318 may be fixed to the disc 340 by one or more fasteners 344 received within apertures 348 on the detector board 304. Alternatively, for example, the plate 318 may be formed integrally with the disc 340. Alternatively, for example, the finger(s) 320 may be fixed directly on the disc 340, removing the need for a separate plate 318, or the plate 318 of the detector board 304 may be formed integral with or fixed to the adjustment ring 254 to rotate therewith, removing the need for a separate disc 340. Alternatively, the plate 318 may be fixed to the disc 340 by adhesive or any other type of fixing mechanism.

The plate 318 is positioned on the disc 340 and the finger(s) 320 are positioned on the plate 318 (or on the disc 340) to contact or engage the petals 308 on the resistor board 300. Additionally, the disc 340 is positioned relative to the back housing 178 such that the finger(s) 320 contact or engage the petals 308. For example, the contact 332 on each finger is positioned to contact the petals 308 on the resistor board 300.

The plate 306 of the resistor board 300 is fixed to the back housing 178. For example, the plate 306 may be fixed to a wall of the back housing 178, may be fixed to a radially-inward projection of the back housing 178, or may be fixed within a channel in the inner wall of the back housing 178. For example, the plate 306 may be press-fit into the back housing 178. Alternatively, for example, the plate 306 may be fixed to the back housing 178 by a fastener, by adhesive, or by any other type of fixing mechanism. Alternatively, for example, the plate 306 may be formed integrally with and monolithically to the back housing 178.

The plate 306 of the resistor board 300 is mounted as to be fixed with the back housing 178 whereas the plate 318 of the detector board 304 is mounted to rotate with the adjustment ring 254, as previously described. As the adjustment ring 254 is rotated, the detector board 304 (and in some configurations the disc 340) is rotated therewith. Rotation of the detector board 304 rotates the finger(s) 320 around the petals 308. Rotation changes are detected by a change in the resistance between the finger(s) 320 and the petals 308.

Figure 5:
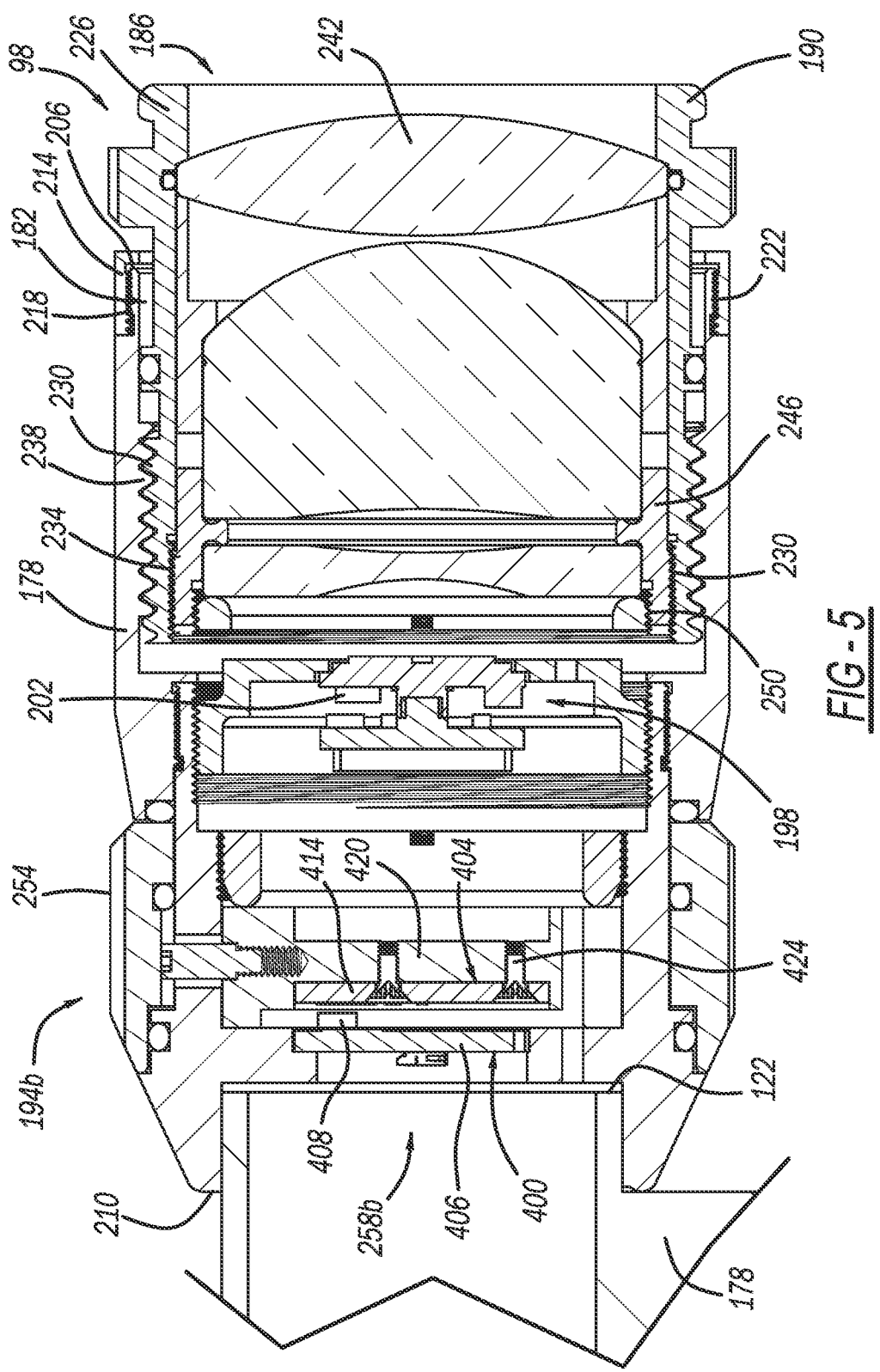
FIG. 5 is a sectional view of another embodiment of the optic in FIG. 2.
Figure 6A:
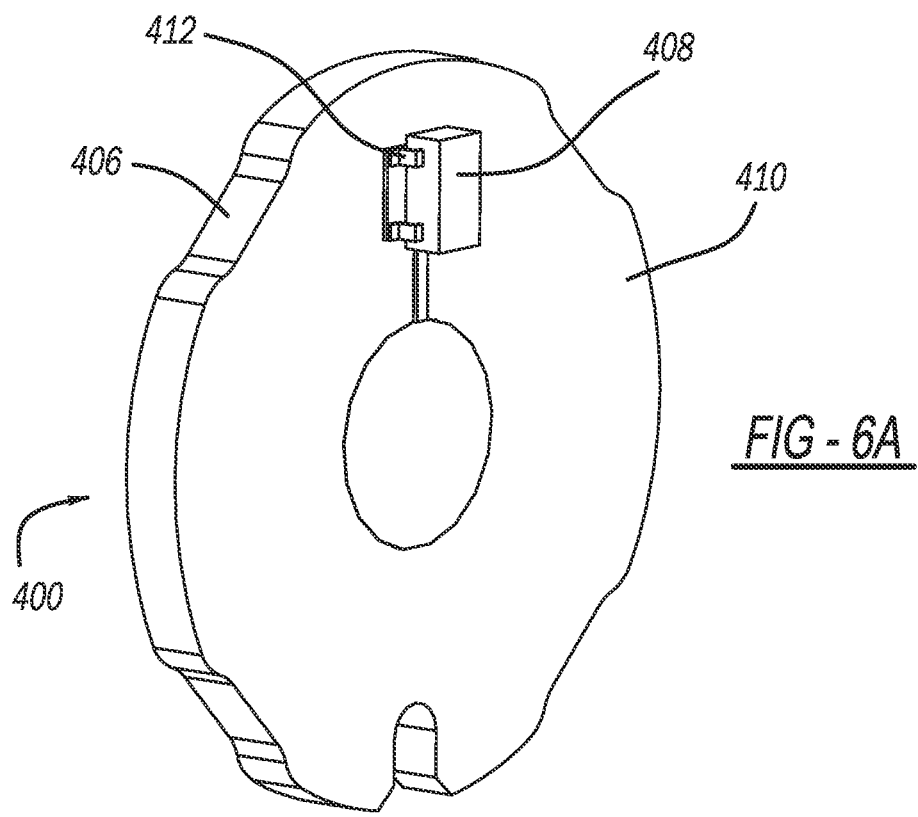
FIG. 6A is a perspective view of a sensor board of the optic in FIG. 5.
Figure 6B:
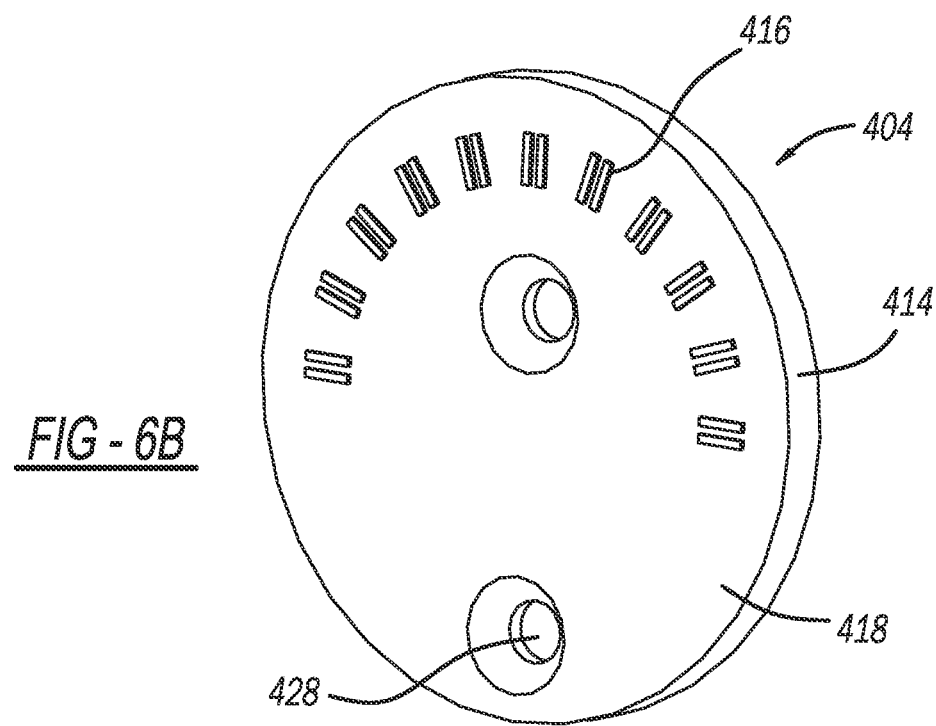
FIG. 6B is a perspective view of a magnet board of the optic in FIG. 5.

Referring to FIGS. 5, 6A, and 6B, in an alternative configuration, zoom assembly 194b may include a detector 258b having a sensor board 400 and a magnet board 404. Detector 258b may convert rotation of the adjustment ring 254 into a digital signal. As illustrated in FIG. 6A, the sensor board 400 may include a plate 406 and a sensor 408. The plate 406 may be a panel or thick sheet having opposing planar faces. For example, the plate 406 may be formed of a composite, a ceramic, or other non-conductive material.

The sensor 408 may be, for example, a magnetic field sensor, a hall-effect sensor, a microelectromechanical, a MEMS sensor, or any other sensor. The sensor 408 may be positioned on a face 410 of the plate 406 to detect rotation of the magnet board 404. For example, the sensor 408 may be positioned in a 12:00 position on the face 410 of the plate 406. Alternatively, the sensor 408 may be positioned at a 6:00 position, a 3:00 position, a 9:00 position, or any other position on the plate 406. The sensor 408 may be fixed on the plate 406 by a plurality of tabs 412 functioning to both secure the sensor 408 on the plate 406 and provide data transfer from the sensor 408. For example, the plurality of tabs 412 may be formed of a conductive material, such as a metal (e.g., copper, aluminum, etc.) or any other conductive material.

As illustrated in FIG. 6B, the magnet board 404 may include a plate 414 and a series of magnets 416. The plate 414 may be a panel or thick sheet having opposing planar faces. For example, the plate 414 may be formed of a composite, a ceramic, or other non-conductive material.

The series of magnets 416 may be fixed on or in the plate 414. For example, the magnet board 404 may be a printed magnet board. For example, the magnets 416 may be printed on a face 418 of the plate 414 such that the magnets 416 are a part of the plate 414 (as a single, integral, monolithic piece). Printed magnets 416 allow for an increased number of adjustments since additional, precise magnets 416 may be printed on the plate 414. An increased number of adjustments provides additional sensitivity and a more precise and accurate zoom capability.

Alternatively, the magnets 416 may be fixed within slots in the plate 414 such that the magnets 416 are flush, protrude beyond, or protrude slightly beyond the front and/or back face of the plate 414. Alternatively, the magnets 416 may be embedded within the plate 414 such that the magnets 416 are either flush with the front and back faces or disposed between the front and back faces of the plate 414. Alternatively, the magnets 416 may be fixed on a surface of the plate 414, such as the front face 418 of the plate 414.

The series of magnets 416 may be formed, for example, in a circular or semicircular pattern on the plate 414. Alternatively, the series of magnets 416 may be formed in any pattern on the plate 414 as long as the sensor 408 can detect a position of the magnet board 404 based on the series of magnets 416. For example, the magnets 416 may be grouped in pairs (e.g., eleven pairs, or any number of pairs) in the circular, semicircular, or other pattern on the magnet board 404. Alternatively, the magnets 416 may be singularly spaced or grouped in any number in the circular, semicircular, or other pattern.

With reference to FIG. 5, when assembled, the magnet board 404 is fixed to a disc 420 (similar to disc 340) that is either integral with or fixed to the adjustment ring 254 and rotating therewith. For example, the magnet board 404, and more specifically the plate 414, may be fixed to the disc 420 by one or more fasteners 424 (e.g., screws, etc.) received within apertures 428 on the magnet board 404. Alternatively, for example, the magnet board 404 may be formed integrally with the disc 420 such that the magnet board 404 and disc 420 are a single, monolithic part. Alternatively, for example, the magnets 416 may be fixed directly in the disc 420 in the previously described arrangement, removing the need for a separate plate 414. Alternatively, the magnet board 404 may be formed integral with or fixed to the adjustment ring 254 to rotate therewith, removing the need for a separate disc 420. Alternatively, the plate 414 of the magnet board 404 may be fixed to the disc 420 by adhesive or any other type of fixing mechanism.

The magnets 416 on the plate 414 (or the disc 420) are positioned a predetermined distance from the sensor board 400 such that the sensor 408 can detect the magnets 416. For example, the sensor 408 detects the presence of the magnet or pair/group of magnets 416 on the plate 414 of the magnet board 404 in a specific location on the plate 414 relative to the sensor board 400. For example, when the sensor 408 is located in the 12:00 position on the plate 406 of the sensor board 400, the sensor 408 detects the presence of the magnet or pair/group of magnets 416 in the 12:00 position on the plate 414 of the magnet board 404.

The plate 406 of the sensor board 400 is fixed to the back housing 178. For example, the plate 406 may be fixed to a wall of the back housing 178, may be fixed to a radially-inward projection of the back housing 178, or may be fixed within a channel in the inner wall of the back housing 178. For example, the plate 406 may be press-fit into the back housing 178. Alternatively, for example, the plate 406 may be fixed to the back housing 178 by a fastener, by adhesive, or by any other type of fixing mechanism. Alternatively, for example, the plate 406 may be formed integrally with and monolithically to the back housing 178.

The plate 406 of the sensor board 400 is mounted to be fixed with the back housing 178 whereas the plate 414 of the magnet board 404 is mounted to rotate with the adjustment ring 254, as previously described. As the adjustment ring 254 is rotated, the magnet board 404 (and in some configurations the disc 420) is rotated therewith. Rotation of the magnet board 404 rotates the magnets 416 which are detected by the sensor 408. Rotation changes are therefore detected by the sensor 408 on the sensor board 400 (i.e. a magnetic field change between the magnets 416 and the sensor 408).

Figure 7:
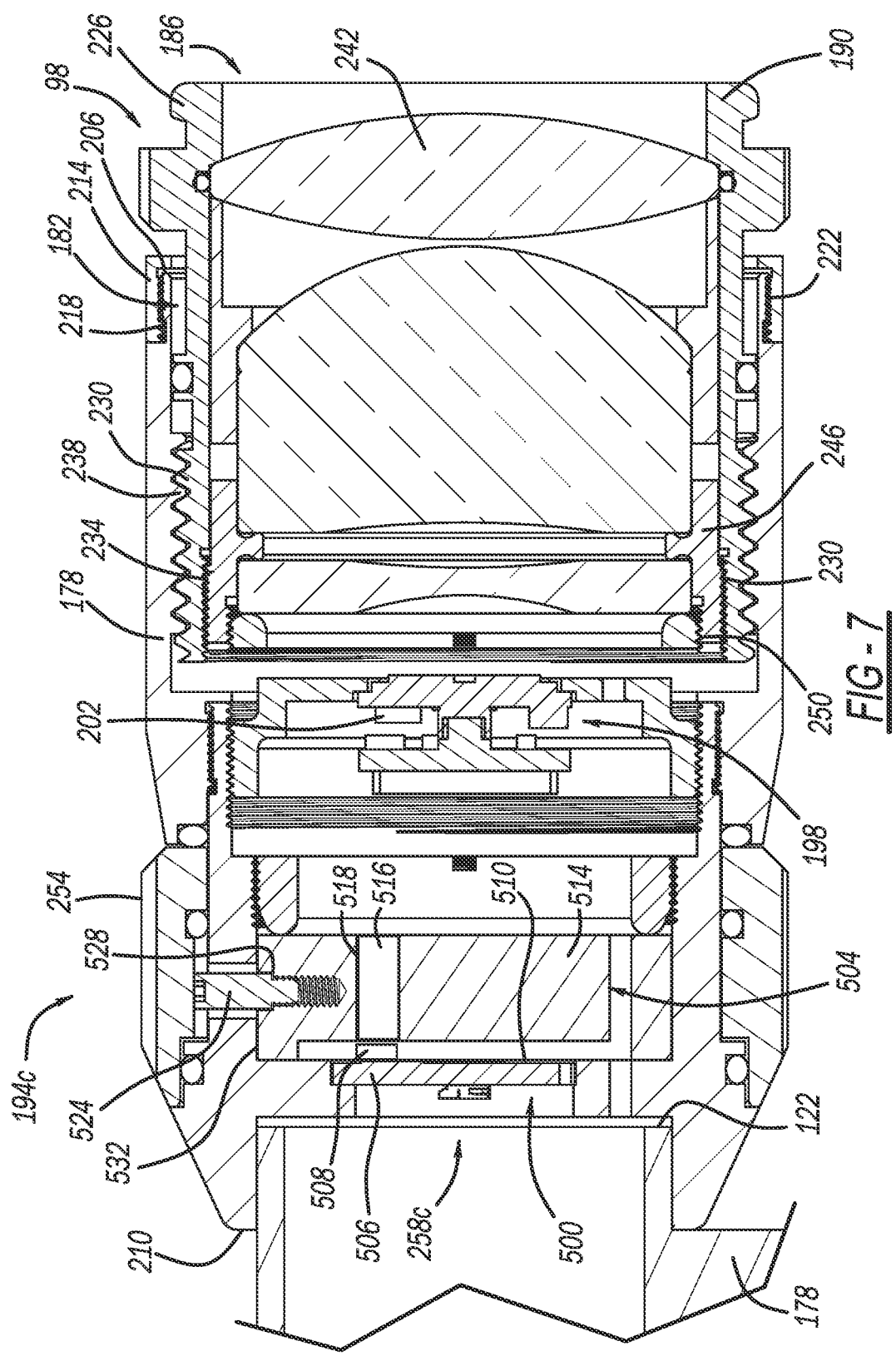
FIG. 7 is a sectional view of another embodiment of the optic in FIG. 2.
Figure 8A:
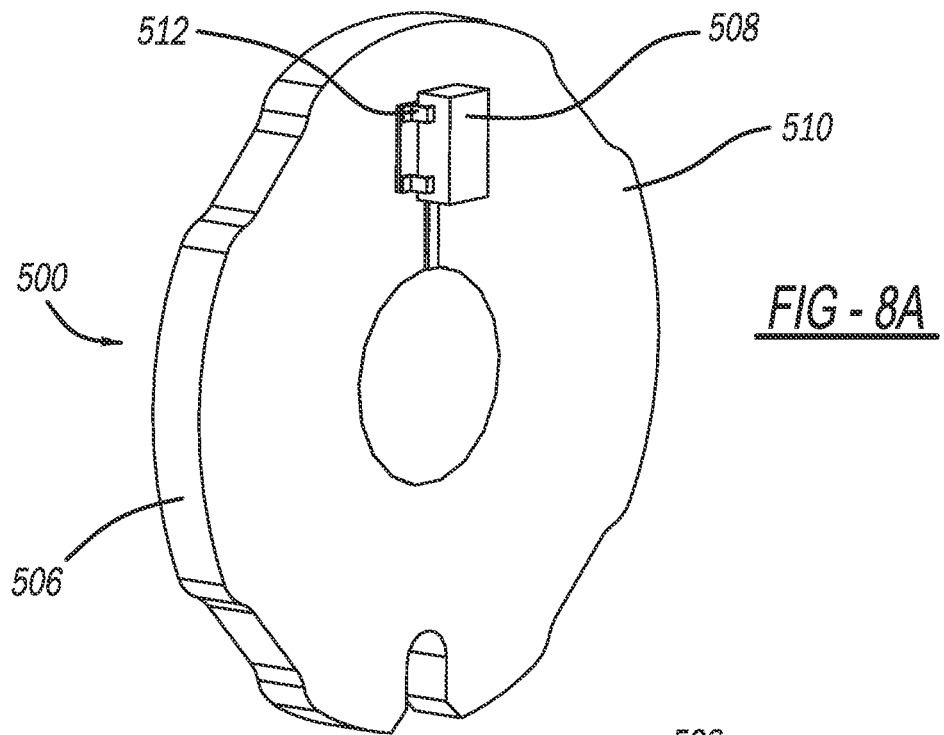
FIG. 8A is a perspective view of a sensor board of the optic in FIG. 7.
Figure 8B:
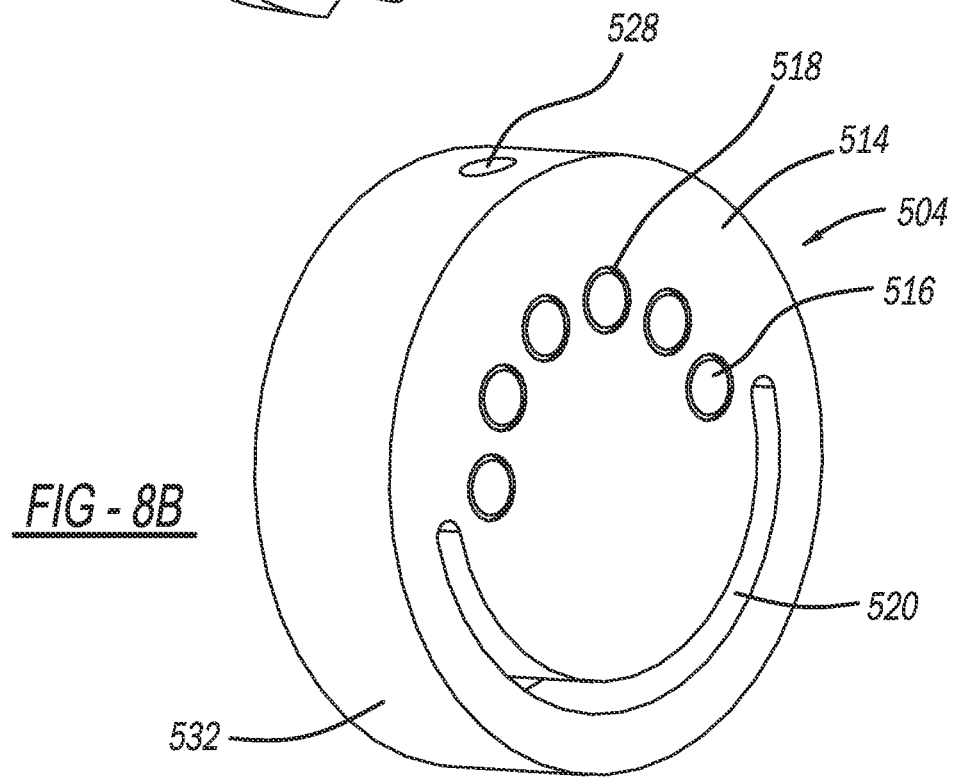
FIG. 8B is a perspective view of a magnet board of the optic in FIG. 7.

Referring to FIGS. 7, 8A, and 8B, in an alternative configuration, the zoom assembly 194c may include a detector 258c having a sensor board 500 and a magnet board 504. Detector 258c may convert rotation of the adjustment ring 254 into a digital signal. As illustrated in FIG. 8A, the sensor board 500 may include a plate 506 and a sensor 508. The plate 506 may be a panel or thick sheet having opposing planar faces. For example, the plate 506 may be formed of a composite, a ceramic, or other non-conductive material.

The sensor 508 may be, for example, a magnetic field sensor, a MEMS sensor, a hall-effect sensor, or another sensor. The sensor 508 may be positioned on a face 510 of the plate 506 to detect rotation of the magnet board 504. The sensor board 500 may be the same as, or similar to, sensor board 400. Similarly, the sensor 508 may be the same as, or similar to, sensor 408.

In one example, the sensor 508 may be positioned on the face 510 of the plate 506 in a 12:00 position. Alternatively, the sensor 508 may be positioned at a 6:00 position, a 3:00 position, a 9:00 position, or any other position on the plate 506. The sensor 508 may be fixed on the face 510 of the plate 506 by a plurality of tabs 512 functioning to both secure the sensor 508 on the plate 506 and provide data transfer from the sensor 508. For example, the plurality of tabs 512 may be formed of a conductive material, such as a metal (e.g., gold, copper, aluminum, etc.) or any other conductive material.

As illustrated in FIG. 8B, the magnet board 504 may include a plate 514 and a series of magnets 516. The plate 514 may be similar to plate 414, and magnets 516 may be similar to magnets 416, except plate 514 is much thicker than plate 414 and magnets 516 are physical magnets in place of printed magnets 416.

The plate 514 may be a panel or disc having opposing planar faces. For example, the plate 514 may be a cylindrical disc. The plate 514 may be formed of, for example, a composite, a ceramic, or other non-conductive material.

The magnets 516 may be, for example, fixed within apertures 518 in the plate 514 and flush with the front and back faces of the plate 514 such that the magnets 516 become part of the plate 514. Alternatively, the magnets 516 may be fixed within the apertures 518 such that the magnets 516 protrude beyond or protrude slightly beyond the front and/or back face of the plate 514. Alternatively, the magnets 516 may be embedded within the plate 514 such that the magnets 516 are either flush with the front and back faces or disposed between the front and back faces of the plate 514. Alternatively, the magnets 516 may be fixed on a surface of the plate 514, such as a front face of the plate 514.

The series of magnets 516 may be formed in a circular or semicircular pattern in the plate 514. Alternatively, the series of magnets 516 may be formed in any pattern in the plate 514 as long as the sensor 508 can detect a position of the magnet board 504 based on the series of magnets 516. In one example, the magnets 516 may be elongated magnets, such as cylindrical magnets. Alternatively, the magnets 516 may have any cross-sectional shape.

The magnet board 504 may include the magnets 516 disposed in a semicircular pattern on a top half of the plate 514 and a slot or channel 520 on a bottom half of the plate 514. In one example, the slot or channel 520 may be cut in a semicircular shape to mirror the shape of the magnets 516. Alternatively, the slot 520 may be an elongated slot or a series of slots. For example, the slot 520 may receive a stationary shaft to restrict rotation of the magnet board 504. Alternatively, or additionally, the slot 520 may provide an aperture to pass through signal wires.

Referring to FIG. 7, when assembled, the magnet board 504, and more specifically the plate 514, is fixed to the adjustment ring 254 and rotates therewith. For example, the plate 514 of the magnet board 504 may be fixed to the adjustment ring 254 by one or more fasteners 524 (e.g., screws, etc.) received within an aperture(s) 528 in the plate 514. For example, the aperture(s) 528 may be formed in a circumferential wall 532 of the plate 514 and may extend radially relative to a center of the plate 514. In this configuration, a disc (such as disc 420 or 340) may not be included, since the magnet board 504 is directly fixed to the adjustment ring 254. Alternatively, the plate 514 of the magnet board 504 may be formed integral with the adjustment ring 254 to create a single monolithic part, such that the fastener 524 is not necessary. Alternatively, for example, the plate 514 of the magnet board 504 may be formed integrally with a disc. Alternatively, the plate 514 of the magnet board 504 may be fixed to a disc by adhesive or any other type of fixing mechanism.

The magnets 516 on the plate 514 are positioned a predetermined distance from the sensor board 500 such that the sensor 508 can detect the magnets 516. For example, the sensor 508 detects the presence of the magnet 516 on the magnet board 504 in a specific location on the plate 514 of the magnet board 504 relative to the sensor board 500. For example, when the sensor 508 is located in the 12:00 position on the plate 506 of the sensor board 500, the sensor 508 detects the presence of the magnet 516 in the 12:00 position on the plate 514 of the magnet board 504.

The plate 506 of the sensor board 500 is fixed to the back housing 178. For example, the plate 506 may be fixed to a wall of the back housing 178, may be fixed to a radially-inward projection of the back housing 178, or may be fixed within a channel in the inner wall of the back housing 178. For example, the plate 506 may be press-fit into the back housing 178. Alternatively, for example, the plate 506 may be fixed to the back housing 178 by a fastener, by adhesive, or by any other type of fixing mechanism. Alternatively, for example, the plate 506 may be formed integrally with and monolithically to the back housing 178.

The plate 506 of the sensor board 500 is mounted to be fixed with the back housing 178 whereas the plate 514 of the magnet board 504 is mounted to rotate with the adjustment ring 254, as previously described. As the adjustment ring 254 is rotated, the magnet board 504 is rotated therewith. Rotation of the magnet board 504 rotates the magnets 516 which are detected by the sensor 508. Rotation changes are therefore detected by the sensor 508 on the sensor board 500 (i.e. a magnetic field change between the magnets 516 and the sensor 508).

Referring to any of FIG. 2, 3, 5, or 7, the display 198 may be disposed, for example, between the processor 202 and the first end 206 of the back housing 178, such that the display 198 is viewed through the ocular assembly 186 in the eyepiece 190. The display 198 may receive data from the processor 202 and display an image for the user to view through the eyepiece 190. The display 198 may selectively display images received from the camera core 114, the processor 202, and/or an input port (not shown) (for example, the image may be received directly from the camera core 114, through the processor 202, and/or from one or more external cameras). Different types of displays 198 may be used. For example, in various embodiments, the display 198 may be implemented as a liquid crystal display (LCD), a Digital Light Processing (DLP) display (e.g., which may provide brighter images than conventional LCD implementations in certain embodiments), an organic light emitting diode (OLED) display, a plasma display, a cathode ray tube (CRT) display, or another type of display as may be appropriate in particular applications. For example, the display may project an image, including the target object from the camera core 114 and a reticle (for example, a cross-hair or red dot).

The processor 202 may be positioned between the first end 206 and the second end 210 of the back housing 178 and may adjust images captured by the camera core 114 using appropriate hardware and/or software in any desired manner. For example, the processor 202 may adjust images captured by the camera core 114 to compensate for different environmental conditions, different distances of the target object, and/or other factors. Additionally, the processor 202 may perform digital zoom operations on captured images to provide zoomed images to the display 198.

The processor 202 may include one or more processors, modules, and/or circuitry, such as one or more printed circuit board (PCBs), configured to implement and perform the functionality of the present disclosure, described in further detail below. For example, the processor 202 may be a controller that includes a processor configured to execute computer-executable instructions stored in memory to carry out and perform the functionality and methods of the present disclosure. Additionally, while the examples of the present disclosure describe the functionality and methods as being performed by the processor 202, the functionality and methods can alternatively be performed by a system controller and/or by a remote computer.

Referring to FIG. 9, the processor 202 may include, in relevant part, a controller 600 that is in communication with the camera core 114, the detector 258, the sensor 162, and the display 198.

The controller 600 may communicate with the camera core 114 to receive images to be processed for the display 198. For example, the camera core 114 may capture digital video images of a target scene that are processed and provided to the user. The target scene may be a scene captured through the opening 146 in the second end 126 of the front housing 102. The images may be continuously captured by the camera core 114 and streamed to the controller 600 for processing. For example, light from the target scene may enter the opening 146 in the second end 126 of the front housing 102 of the digital aiming system 10 and may be captured by the camera core 114. For example, the images may be zoomed images of the target scene provided by optical zoom and/or digital zoom features of the camera core 114. The images may then be processed by the controller 600 and sent to the display 198.

The controller 600 may process the light reflected from the target and transmitted through the objective lens assembly 110 to generate digital signals. When a pixel on a charge coupled device (CCD) in the camera core 114 receives the light, an electric charge corresponding to the light intensity is generated. The controller 600 converts the electric charge into an electric signal to obtain the light intensity (concentration value) received by each pixel. The controller 600 may then construct the image based on the light intensity at each pixel. For example, each pixel may transfer data in 256 levels of light intensity, where, in monochrome, black is considered to be "0", white is considered to be "256," and gray (which contains white and black, half and half) is considered to be "127." Once the controller 600 processes and reconstructs the image, the controller 600 may pass the image signal to the display 198.

The controller 600 may be in communication with the detector 258 and the camera core 114. The detector 258 may detect changes in the adjustment ring 254 as previously described and communicate the changes to the controller 600 as a digital signal. For example, with reference to FIGS. 3-4B, detector 258 detects resistance changes between the contact 332 on the fingers 320 and the resistor board 300. As the detector board 304 rotates, the contacts 332 move across the petals 308 and the center disc 312 changing the resistance. The detector 258 communicates the resistance changes as a digital signal to the controller 600. The controller 600 tracks the resistance changes to determine a position of the adjustment ring 254 and the desired magnification associated with the position.

For example only and with additional reference to FIG. 10, rotation of the adjustment ring 254 may be assumed to be less than or equal to 360°. The contacts 332 rotate with the adjustment ring 254 and make electrical connections to discrete contacts connected to the main body housing (in FIG. 10, only a single contact is represented for simplicity). These discrete contacts are the individual petals 308 on the resistor board 300 that is mounted stationary to the back housing 178 (in FIG. 10, only ten petals 308 are represented for simplicity). The petals 308 are each connected to various circuit nodes 604 on a voltage divider 608, as shown. The contact 332 completes the circuit to an inner conductive ring (not shown), which interfaces with the controller 600 (for example, analog input). The controller 600 determines the position of the adjustment ring 254 based on the measured voltage.

Alternatively, rotation of the adjustment ring 254 may be determined by inductive sensing. Using the principles of induction in a wire loop and eddy currents to detect relative position of an electrically conducting target that rotates proximal to a set of wire loops, the rotation of the adjustment ring 254 may be detected with high precision. A transmitter coil generates an AC magnetic field that couples to a pair of receiver coils that are arranged to be 90° out of phase electrically, allowing for a sine-cosine relation. This technique is similar to a linear variable differential transformer, but utilizes coils printed on a printed circuit board (PCB) rather than coils physically arranged on a stator. The coils (transmitter and receiver) are the petals 308 and the center disc 312 printed on the resistor board 300, mounted stationary to the back housing 178, while the conductive target is the contacts 332 that rotate with the adjustment ring 254. The detector 258 excites the transmitter coil, interprets the feedback from the receiver coils and communicates position information as a digital signal to the controller 600, which applies digital zoom.

Alternatively, for example, with reference to FIGS. 5-6B detector 258 detects magnetic field changes between the magnetic field sensor 408 and the magnets 416 on the printed magnet board 404. As the magnet board 404 rotates with rotation of the adjustment ring 254, the magnets 416 rotate in front of the magnetic field sensor 408, changing the magnetic flux (stronger and weaker) and generating a voltage. The detector 258 communicates the magnetic field changes (as a voltage) to the controller 600 as a digital signal. The controller 600 tracks the changes to determine a position of the adjustment ring 254 and the desired magnification associated with the position. The printed magnets 416 on the printed magnet board 404 increase the number of adjustments significantly, leading to more accurate and precise zoom changes.

Alternatively, for example, with reference to FIGS. 7-8B, detector 258 detects magnetic field changes between the magnetic field sensor 508 and the magnets 516 embedded in magnet board 504. As the magnet board 504 rotates with rotation of the adjustment ring 254, the magnets 516 rotate in front of the magnetic field sensor 508. The detector 258 communicates the magnetic field changes to the controller 600 as a digital signal. The controller 600 tracks the changes to determine a position of the adjustment ring 254 and the desired magnification associated with the position.

Alternatively, a Hall Effect method could detect changes in magnetic flux when the adjustment ring 254 is rotated. The adjustment ring 254 may contain inward facing gear teeth that interface with a small gear with a magnet in the center. The magnet is magnetized such that the poles are normal to a longitudinal axis of the cylindrical magnet. As the adjustment ring 254 is rotated, the intermeshed gear teeth cause the magnet to rotate. As the magnet rotates, a magnetic sensor detects the change in pole position. The position of the magnet is digitized by the detector 258 and communicated to the controller 600 for further interpretation and to apply zoom.

Alternatively, an optical sensor could detect changes in position of the adjustment ring 254. The adjustment ring 254 could include a disc (similar to disc 340, 420) fixed to rotate as the adjustment ring 254 rotates. The disc may include surface features (for example, textures, colored marks, etc.) detectible by the optical sensor. As the adjustment ring 254 is rotated, the disc is rotated. As the disc rotates, the optical sensor detects the change in position. The position of the disc (and adjustment ring 254) is digitized by the detector 258 and communicated to the controller 600 for further interpretation and to apply zoom.

Referring back to FIG. 0, the controller 600 receives and determines the detected magnification change from the detector 258. For example, the controller 600 stores a chart correlating various positions, resistances, voltages, and/or magnetic field strengths with magnifications and objective lens assembly positions. The controller 600 tracks the current magnification of the camera core 114, When the controller 600 receives the digital signal indicating the position, resistance, and/or magnetic field strength from the detector 258, the controller 600 correlates this value with a magnification. The controller 600 adjusts the camera core 114 to the determined magnification.

The controller 600 may be in communication with the sensor 162 to detect and adjust the windage, elevation, and/or brightness of the reticle. For example, rotation of the windage adjustment turret 150, the elevation adjustment turret 154, and/or the brightness adjustment turret 158 may be detected by the sensor 162 positioned adjacent the adjustment system 118 in the front housing 102. The sensor 162 may communicate the adjustment to the controller 600. The controller 600 may correlate the adjustment from the sensor 162 with a specific windage, elevation, and/or brightness value and may output the correction to the camera core 114.

Figure 11:
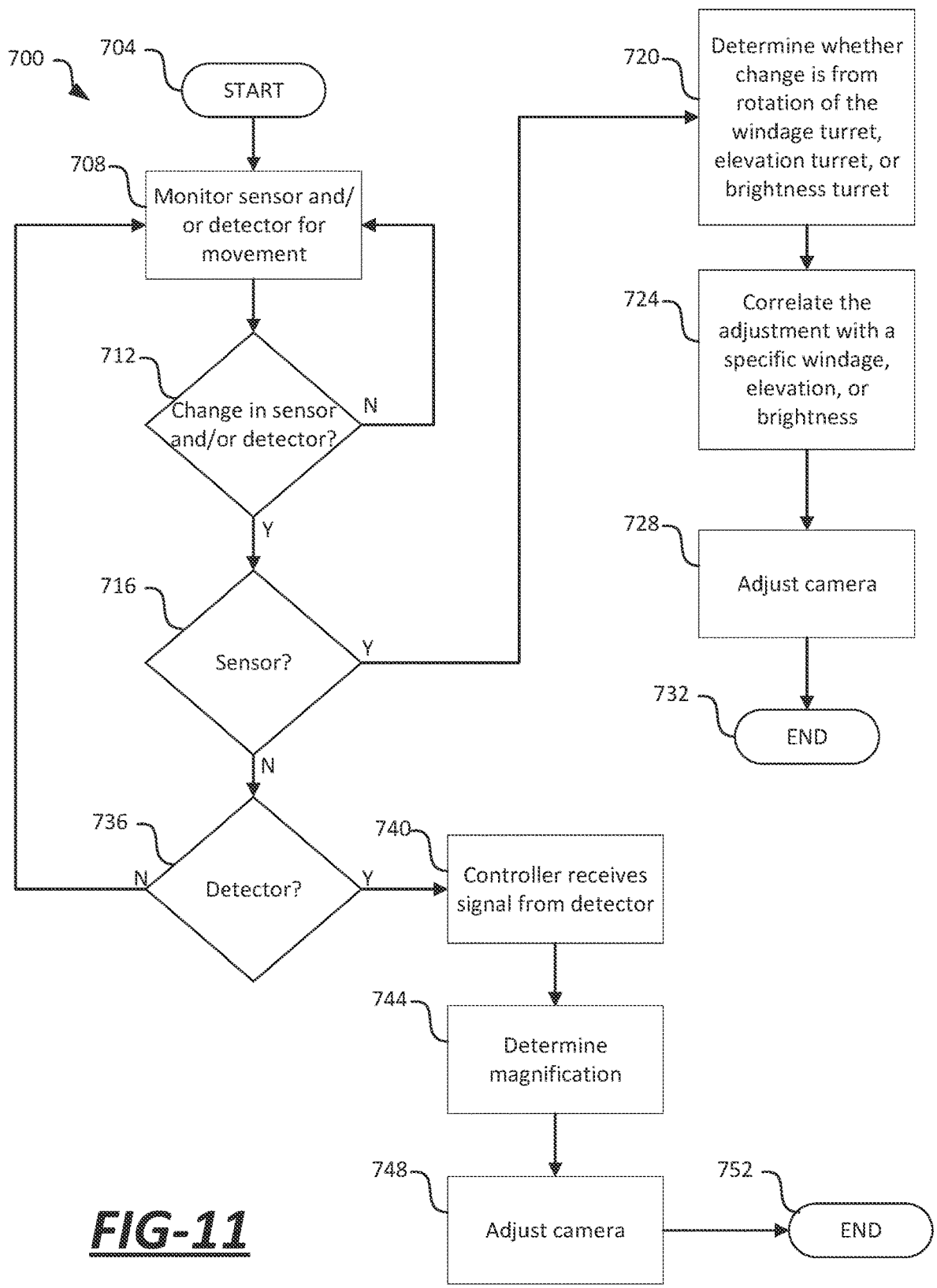
FIG. 11 is a flow chart for a method of adjusting an aiming system of the optic in FIG. 1.

With reference to FIG. 11, a flowchart for a control algorithm 700 in accordance with the present teachings is shown. The control algorithm 700 can be executed, for example, by the controller 600 or another suitable controller. The control algorithm 700 shown in FIG. 11 is a high-level process overview of the control algorithm 700 executed by the controller 600 and starts at 704. At 708, the sensor 162 and detector 258 are monitored, for example by the controller 600, for changes.

At 712, the controller 600 determines whether a change in the sensor 162 and/or detector 258 has occurred. A change of the detector 258 and/or sensor 162 indicates movement of the adjustment ring 254 and/or one of the windage adjustment turret 150, elevation adjustment turret 154, and brightness adjustment turret 158, respectively. If true, the controller 600 determines whether the change is in the sensor 162 output at 716. If false at 712, method 700 returns to 708.

If true at 716, the controller 600 determines whether the change in the sensor 162 output is from rotation of the windage adjustment turret 150, the elevation adjustment turret 154, and/or the brightness adjustment turret 158 at 720. As previously stated, the sensor 162 may be a single sensor detecting rotation in all of the windage adjustment turret 150, the elevation adjustment turret 154, and the brightness adjustment turret 158, or the sensor 162 may be multiple sensors, one of each of the windage adjustment turret 150, the elevation adjustment turret 154, and the brightness adjustment turret 158.

For example, when the windage adjustment turret 150 is rotated by an operator or user, the sensor 162 may detect the rotation and position of the windage adjustment turret 150. For example, the sensor 162 may be a single-pole, multi-throw switch, an inductive sensor, a Hall Effect sensor, or any other type of rotary sensor or other sensor that detects rotation and position of a turret. The sensor 162 outputs a signal indicative of the change and position of the windage adjustment turret 150.

Likewise, when the elevation adjustment turret 154 is rotated by an operator or user, the sensor 162 may detect and output a signal indicative of the rotation and position of the elevation adjustment turret 154. When the brightness adjustment turret 158 is rotated by an operator or user, the sensor 162 may detect and output a signal indicative of the rotation and position of the brightness adjustment turret 158.

At 724, the output from the sensor 162 is correlated with a specific windage, elevation, or brightness. For example, the sensor 162 output may be correlated with a specific windage, elevation, or brightness on a chart stored by the controller 600. Alternatively, a specific windage, elevation, or brightness may be otherwise determined from the sensor 162 output. For example, the output may be consistent or variable to specific menu inputs providing different inputs for adjustment to the digital settings.

At 728, the camera 114 may be adjusted accordingly to the specific windage, elevation, or brightness. For example, the controller 600 may directly adjust the camera 114 and/or a reticle to reflect the specific windage, elevation, or brightness. Alternatively, the controller 600 may send control signals to the NUC 174 to adjust the camera 114 and/or a reticle to reflect the specific windage, elevation, or brightness.

At 732, method 700 ends.

If false at 716, the controller 600 determines whether the change is in the detector 258 output at 736. If false, method 700 returns to 708. If true at 736, the controller receives the digital signal from the detector 258 at 740. The signal may be an electrical signal, a resistance signal, or a magnetic field signal.

At 744 the controller 600 interprets the signal to determine a magnification. For example, the detector 258 communicates the resistance changes to the controller 600. The controller 600 tracks the resistance changes (i.e., voltages) to determine a position of the adjustment ring 254, The controller 600 correlates the position of the adjustment ring 254 with a desired magnification (for example, using a chart stored in the memory of the controller 600).

Alternatively, for example, the detector 258 excites the transmitter coil, interprets the feedback from the receiver coils and communicates position information to the controller 600. The controller 600 correlates the position of the adjustment ring 254 with a desired magnification (for example, using a chart stored in the memory of the controller 600).

Alternatively, for example, the detector 258 communicates measured magnetic field data to the controller 600. The controller 600 tracks the changes to determine a position of the adjustment ring 254.

At 748, the camera 114 may be adjusted accordingly to the specific magnification. For example, the controller 600 may directly adjust the camera 114. Alternatively, the controller 600 may send control signals to the NUC 174 to adjust the camera 114 to reflect the specific magnification.

At 752, the method 700 ends.

Figure 12:
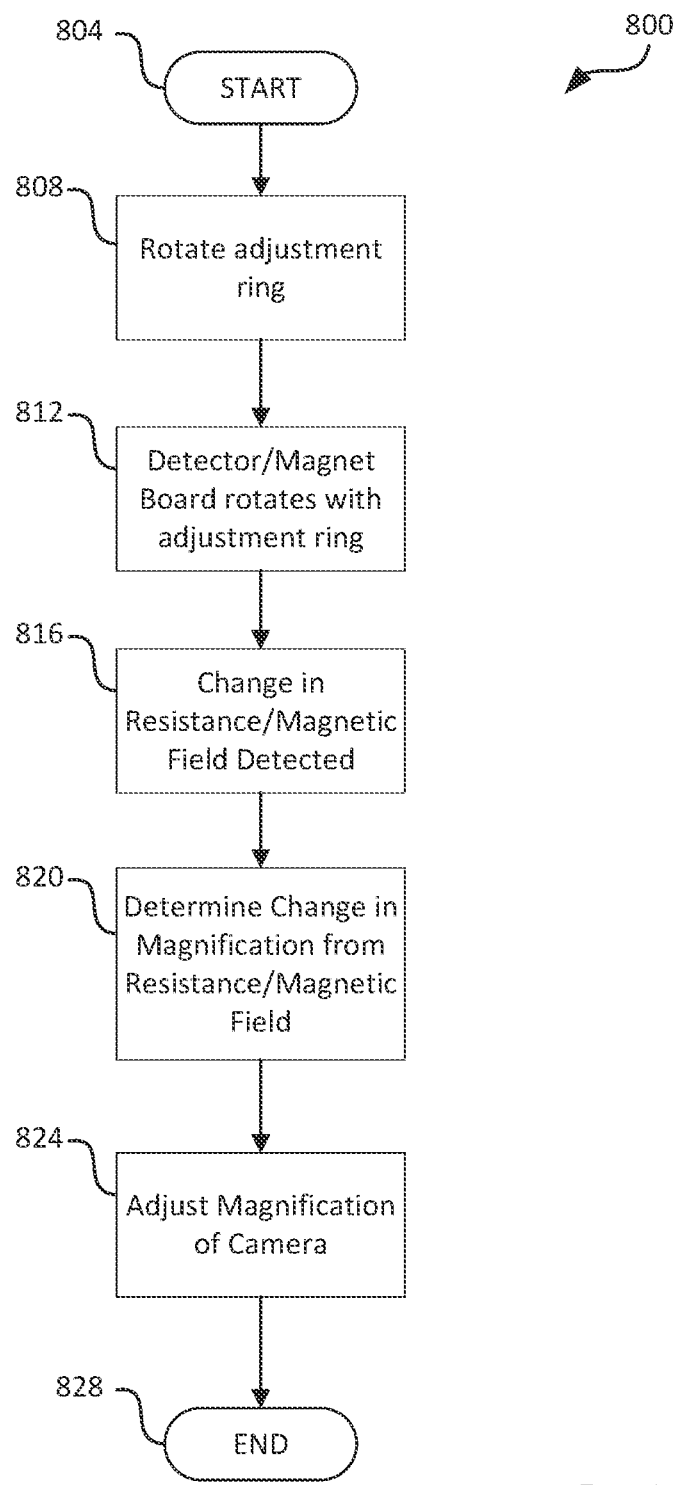
FIG. 12 is a flow chart for a method of adjusting a magnification of the optic in FIG. 1.

With reference to FIG. 12, a flowchart for a method 800 of adjusting magnification of the digital aiming system 10 in accordance with the present teachings is shown. The algorithm 800 can be executed, for example, by the controller 600, the detector 258, or another suitable controller. The algorithm 800 shown in FIG. 12 is a high-level process overview of the algorithm 800 and starts at 804. At 808, the adjustment ring 254 is rotated by an operator or user.

At 812, the detector board 304 or magnet board 404, 504 rotates with the adjustment ring 254. For example, the detector board 304 or magnet board 404, 504 may be fixed directly to the adjustment ring 254 (for example, as a single, monolithic part or as a separate part fixed thereto) for rotation with the adjustment ring 254. Alternatively, for example, the detector board 304 or magnet board 404, 504 may be fixed to the disc 340, 420 (for example, as a single, monolithic part or as a separate part fixed thereto) which is fixed for rotation with the adjustment ring 254.

At 816 a change in resistance or a change in a magnetic field is detected. For example, the detector 258 may detect resistance changes between the contact 332 on the fingers 320 and the resistor board 300. As the detector board 304 rotates, the contacts 332 move across the petals 308 and the center disc 312 changing the resistance or voltage. The detector 258 communicates the resistance changes or voltage as a digital signal to the controller 600.

Alternatively, for example, the detector 258 may detect magnetic field changes between the magnetic field sensor 408, 508 and the magnets 416 on the printed magnet board 404 or the magnets 516 embedded in the magnet board 504, respectfully. As the magnet board 404, 504 rotates with rotation of the adjustment ring 254, the magnets 416, 516 rotate in front of the magnetic field sensor 408, 508. The detector 258 communicates the magnetic field changes to the controller 600 as a digital signal.

At 820, the desired magnification and change in magnification from the current magnification are determined based on the signal from the detector 258. For example, the controller 600 receives the signal from the detector 258. The controller 600 may store a chart correlating various adjustment ring 254 positions and/or magnetic fields/voltages with a series of preset magnifications. The controller 600 may convert the magnetic field or voltage to a position of the adjustment ring 254 and correlate the adjustment ring 254 position to a preset magnification. Alternatively, the controller 600 may convert the magnetic field or voltage to a preset magnification directly.

At 824, the magnification of the camera 114 may be adjusted to the new magnification. For example, the controller 600 may directly adjust the camera 114. Alternatively, the controller 600 may send control signals to the NUC 174 to adjust the camera 114 to reflect the specific magnification.

At 828, method 800 ends.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optic for a firearm comprising:
   a housing;
   an optics train disposed within the housing and along a longitudinal axis of the housing;
   an adjustment ring supported by the housing and configured to adjust a magnification of the optics train; and
   a detector engaged with the adjustment ring and configured to convert rotation of the adjustment ring into a digital magnification, the detector including a sensor board and a magnet board.

2. The optic of claim 1, wherein the magnet board includes a plurality of magnets.

3. The optic of claim 2, wherein the magnets are embedded within the magnet board.

4. The optic of claim 2, wherein the magnets are printed on the magnet board.

5. The optic of claim 2, wherein the sensor board includes a magnetic field sensor that senses a magnetic field of the plurality of magnets.

6. The optic of claim 1, wherein the magnet board is fixed for rotation with the adjustment ring, and the sensor board is fixed to the housing.

7. A method for controlling an optic for a firearm, the method comprising:
   detecting, by a detector, rotation of an adjustment ring including detecting a magnetic field change by a magnetic field sensor of a position of a plurality of magnets on a magnet board, the magnet board being configured to rotate with rotation of the adjustment ring;
   converting, by the detector, the rotation of the adjustment ring to a digital signal;
   correlating, by a controller, the digital signal to a magnification; and
   adjusting, by the controller, a magnification of the optic.

8. The method of claim 7, wherein the plurality of magnets are embedded in the magnet board.

9. The method of claim 7, wherein the plurality of magnets are printed on the magnet board.

10. A control system for an optic for a firearm, the control system comprising:
    a detector configured to detect rotation of an adjustment ring, the detector being configured to convert the rotation of the adjustment ring to a digital signal; and
    a controller configured to correlate the digital signal to a magnification, the controller being configured to adjust a magnification of the optic,
    wherein the detector is configured to detect a magnetic field change by a magnetic field sensor of a position of a plurality of magnets on a magnet board, the magnet board being configured to rotate with rotation of the adjustment ring.

11. The control system of claim 10, wherein the plurality of magnets are embedded in the magnet board.

12. The control system of claim 10, wherein the plurality of magnets are printed on the magnet board.

\* \* \* \* \*